United States Patent
Koplar

(10) Patent No.: US 8,961,324 B2
(45) Date of Patent: Feb. 24, 2015

(54) METHOD AND SYSTEM FOR ENCODED INFORMATION PROCESSING

(75) Inventor: Edward J. Koplar, St. Louis, MO (US)

(73) Assignee: Koplar Interactive Systems International, L.L.C., St. Louis, MO (US)

( * ) Notice: Subject to any disclaimer, the term of this patent is extended or adjusted under 35 U.S.C. 154(b) by 851 days.

(21) Appl. No.: 12/487,053

(22) Filed: Jun. 18, 2009

(65) Prior Publication Data

US 2009/0312105 A1 Dec. 17, 2009

Related U.S. Application Data

(63) Continuation of application No. 12/263,101, filed on Oct. 31, 2008, now abandoned.

(60) Provisional application No. 60/984,248, filed on Oct. 31, 2007, provisional application No. 60/987,320, filed on Nov. 12, 2007, provisional application No. 61/029,704, filed on Feb. 19, 2008.

(51) Int. Cl.
*A63F 13/338* (2014.01)
*A63F 13/30* (2014.01)

(52) U.S. Cl.
CPC ............... *A63F 13/12* (2013.01); *A63F 13/338* (2014.09); *A63F 2300/55* (2013.01); *A63F 2300/554* (2013.01); *A63F 2300/558* (2013.01); *A63F 2300/5593* (2013.01); *A63F 2300/61* (2013.01)
USPC .................... 463/48; 235/462.01; 235/462.13; 235/462.15

(58) Field of Classification Search
CPC ..................................................... A63F 13/338
USPC .............. 463/48; 235/462.01, 462.13, 462.15
See application file for complete search history.

(56) References Cited

U.S. PATENT DOCUMENTS

| | | | |
|---|---|---|---|
| 5,594,493 A | 1/1997 | Nemirofsky | |
| 6,240,555 B1 * | 5/2001 | Shoff et al. | 725/110 |
| 6,285,774 B1 | 9/2001 | Schumann et al. | |
| 6,577,748 B2 | 6/2003 | Chang | |
| 6,604,682 B2 | 8/2003 | Wakamiya et al. | |

(Continued)

FOREIGN PATENT DOCUMENTS

| | | |
|---|---|---|
| EP | 0957448 A2 | 11/1999 |
| JP | 6071049 | 3/1994 |

(Continued)

OTHER PUBLICATIONS

"About NTN Buzztime, Inc.", http://www.ntn.com/corp/about/index/htm, accessed Jan. 16, 2008, 2 pages.

(Continued)

*Primary Examiner* — Bach Hoang
(74) *Attorney, Agent, or Firm* — The Small Patent Law Group LLC; Christopher R. Carroll

(57) ABSTRACT

Methods and system for encoded information processing are described. In one embodiment, an encoded pattern may be optically detected from source media. Gaming data and associated synchronization data may be decoded from the encoded pattern. The gaming data may be synchronized for use during gaming based on the synchronization data. Additional methods and systems are disclosed.

24 Claims, 9 Drawing Sheets

(56) References Cited

U.S. PATENT DOCUMENTS

| | | | |
|---|---|---|---|
| 6,746,330 B2 | 6/2004 | Cannon | |
| 6,766,956 B1 * | 7/2004 | Boylan et al. | 235/462.45 |
| 6,846,238 B2 | 1/2005 | Wells | |
| 6,869,016 B2 | 3/2005 | Waxelbaum | |
| 6,967,566 B2 | 11/2005 | Weston et al. | |
| 7,025,272 B2 | 4/2006 | Yavid et al. | |
| 7,066,387 B2 * | 6/2006 | Itoh et al. | 235/382 |
| 7,077,321 B2 | 7/2006 | Longacre | |
| 7,080,786 B2 | 7/2006 | Longacre | |
| 7,118,482 B2 * | 10/2006 | Ishihara et al. | 463/43 |
| 7,156,311 B2 | 1/2007 | Attia et al. | |
| 7,163,459 B2 | 1/2007 | Tanskanen | |
| 7,168,621 B2 | 1/2007 | Ghai et al. | |
| 7,213,254 B2 * | 5/2007 | Koplar et | 725/23 |
| 7,242,816 B2 | 7/2007 | Attia et al. | |
| 7,245,780 B2 | 7/2007 | Attia et al. | |
| 7,287,696 B2 | 10/2007 | Attia et al. | |
| 7,309,015 B2 | 12/2007 | Frantz et al. | |
| 7,313,251 B2 | 12/2007 | Rhoads | |
| 7,387,250 B2 | 6/2008 | Muni | |
| 7,454,776 B1 | 11/2008 | Walker et al. | |
| 7,570,781 B2 | 8/2009 | Rhoads et al. | |
| 7,626,635 B2 * | 12/2009 | Withers et al. | 348/473 |
| 7,757,254 B2 * | 7/2010 | Shoff et al. | 725/44 |
| 7,974,435 B2 * | 7/2011 | Maltagliati et al. | 382/100 |
| 8,018,531 B2 * | 9/2011 | Withers et al. | 348/473 |
| 2001/0056372 A1 * | 12/2001 | Rogan et al. | 705/14 |
| 2002/0016750 A1 | 2/2002 | Attia | |
| 2002/0088853 A1 * | 7/2002 | Itoh et al. | 235/382 |
| 2002/0183102 A1 * | 12/2002 | Withers et al. | 455/575 |
| 2004/0227854 A1 * | 11/2004 | Withers et al. | 348/486 |
| 2004/0254836 A1 * | 12/2004 | Emoke Barabas et al. | 705/14 |
| 2005/0004844 A1 | 1/2005 | Attia | |
| 2005/0011957 A1 | 1/2005 | Attia et al. | |
| 2005/0015310 A1 | 1/2005 | Frantz et al. | |
| 2005/0015311 A1 | 1/2005 | Frantz et al. | |
| 2005/0015815 A1 * | 1/2005 | Shoff et al. | 725/135 |
| 2005/0029354 A1 | 2/2005 | Frantz et al. | |
| 2005/0029356 A1 | 2/2005 | Frantz et al. | |
| 2005/0033599 A1 | 2/2005 | Frantz et al. | |
| 2005/0043093 A1 * | 2/2005 | Takeuchi | 463/40 |
| 2005/0082370 A1 | 4/2005 | Frantz et al. | |
| 2005/0094031 A1 | 5/2005 | Tecot | |
| 2005/0246196 A1 | 11/2005 | Frantz et al. | |
| 2006/0040746 A1 * | 2/2006 | Eguchi et al. | 463/43 |
| 2006/0080556 A1 | 4/2006 | Rhoads | |
| 2006/0111165 A1 * | 5/2006 | MacIver et al. | 463/9 |
| 2006/0123451 A1 * | 6/2006 | Preisman | 725/86 |
| 2006/0175413 A1 | 8/2006 | Longacre | |
| 2006/0200260 A1 | 9/2006 | Hoffberg | |
| 2007/0071322 A1 * | 3/2007 | Maltagliati et al. | 382/181 |
| 2007/0167226 A1 | 7/2007 | Kelly et al. | |
| 2007/0191100 A1 | 8/2007 | Counts | |
| 2007/0286109 A1 | 12/2007 | Kaku | |

FOREIGN PATENT DOCUMENTS

| | | |
|---|---|---|
| JP | 6238031 | 8/1994 |
| JP | 2000317035 | 11/2000 |
| JP | 2007159827 | 6/2007 |
| WO | 9964980 A1 | 12/1999 |

OTHER PUBLICATIONS

"Buzztime Corporate Profile", 2 pages.

"Buzztime on Your Mobile Phone", http://www.ntn.com/platforms/mobile/index.htm, accessed Jan. 16, 2008, 1 page.

"NTN Buzztime Inc. Launches Text2TV Service Bringing a New Level of Interactivity to Buzztime Sites", Buzztime, Inc. press release, http://phx.corporate-ir.net/phoenix/zhtml?c=71750&p=irol-newsArticle&ID=965609&highlight=,accessed Jan. 16, 2008, 4 pages.

Examiners Interview for U.S. Appl. No. 11/532,835 dated Apr. 9, 2010, 3 pages.

Calic, "Highly Efficient Low-Level Feature Extraction for Video Representation and Retrieval", Submitted for the Degree of Doctor of Philosophy, Department of Electronic Engineering, Queen Mary, University of London, 2004, 181 pages.

Amendment for U.S. Appl. No. 11/532,835 dated Jan. 25, 2010; 9 pages.

Preliminary Amendment for U.S. Appl. No. 11/532,835 dated May 28, 2009; 10 pages.

Examiners Interview for U.S. Appl. No. 11/532,835 dated Jun. 11, 2009; 2 pages.

Examiners Interview for U.S. Appl. No. 11/532,835 dated Jan. 26, 2010; 3 pages.

Non-Final Office Action for U.S. Appl. No. 11/532,835 dated Mar. 8, 2010, 12 pages.

U.S. Appl. No. 11/532,835: Certificate of Correction Sep. 27, 2011.

U.S. Appl. No. 11/532,835: Notice of Allowance Feb. 22, 2011.

U.S. Appl. No. 11/532,835: Determination of Patent Term Adjustment Under 35 U.S.C. 154(b) Feb. 22, 2011.

U.S. Appl. No. 11/532,835: Notice of Allowability Feb. 15, 2011.

U.S. Appl. No. 11/532,835: List of References.

U.S. Appl. No. 11/532,835: Request for Continued Examination Transmittal Jan. 31, 2011.

U.S. Appl. No. 11/532,835: Amendment & Response Under 37 C.F.R. 1.111 Jan. 31, 2011.

U.S. Appl. No. 11/532,835: OA—Interview Summary Nov. 23, 2010.

U.S. Appl. No. 11/532,835: OA—Final Aug. 27, 2010.

U.S. Appl. No. 11/532,835: Amendment & Response Under 37 C.F.R. 1.111 Jul. 8, 2010.

U.S. Appl. No. 12/263,101: OA—Responsive Jan. 24, 2012.

U.S. Appl. No. 12/263,101: Response to Restriction Requirement Nov. 29, 2011.

U.S. Appl. No. 12/263,101: List of References.

U.S. Appl. No. 12/263,101: OA—Responsive Sep. 29, 2011.

U.S. Appl. No. 12/577,592: OA—Final Rejection Jun. 5, 2012.

U.S. Appl. No. 12/577,592: List of References.

U.S. Appl. No. 12/577,592: Amendment and Response May 16, 2012.

U.S. Appl. No. 12/577,592: OA—Responsive Feb. 16, 2012.

* cited by examiner

METHOD AND SYSTEM FOR ENCODED INFORMATION PROCESSING

CROSS-REFERENCE TO RELATED APPLICATIONS

This application is a continuation U.S. patent application Ser. No. 12/263,101, filed Oct. 31, 2008, which claims the benefit of U.S. Provisional patent applications entitled "Method and System for Pattern Processing", Ser. No. 60/984,248, filed 31 Oct. 2007, "Method and System for Pattern Processing", Ser. No. 60/987,320, filed 12 Nov. 2007, and "Method and System for Encoded Information Processing", Ser. No. 61/029,704, filed 19 Feb. 2008, the entire contents of the applications are herein incorporated by reference.

FIELD

The present application relates generally to the technical field of information processing. In specific examples, the present application may relate to a method and system for encoded information processing and/or a method and system for scheduling gaming data.

BACKGROUND

A user interacts with controls on a video game unit to play a video game for entertainment purposes. The user may connect with other users of a network to participate jointly in a game, or the user may be a sole participant in the game.

BRIEF DESCRIPTION OF THE DRAWINGS

Some embodiments are illustrated by way of example and not limitation in the figures of the accompanying drawings in which.

DETAILED DESCRIPTION

Example methods and systems for encoded information processing are described. In the following description, for purposes of explanation, numerous specific details are set forth in order to provide a thorough understanding of example embodiments. It will be evident, however, to one of ordinary skill in the art that embodiments of the invention may be practiced without these specific details.

A bar code or other another type of encoded pattern may be detected optically from printed matter or a display device (e.g., a television). Gaming data may be decoded from the encoded pattern for use during a video game. Gaming data may also be decoded from an encoded audio signal.

The gaming data may include puzzle data, map data, character data, weapon data, or any other data that may enhance or otherwise alter game play. The gaming data may not be immediately used by the video game, but rather may be used according to synchronization data. For example, a new puzzle received as a portion of the gaming data may only become available when a television show that corresponds to the puzzle is aired on a television network. The synchronization data may either also be decoded from the encoded pattern or received from a signal source.

Figure 1:
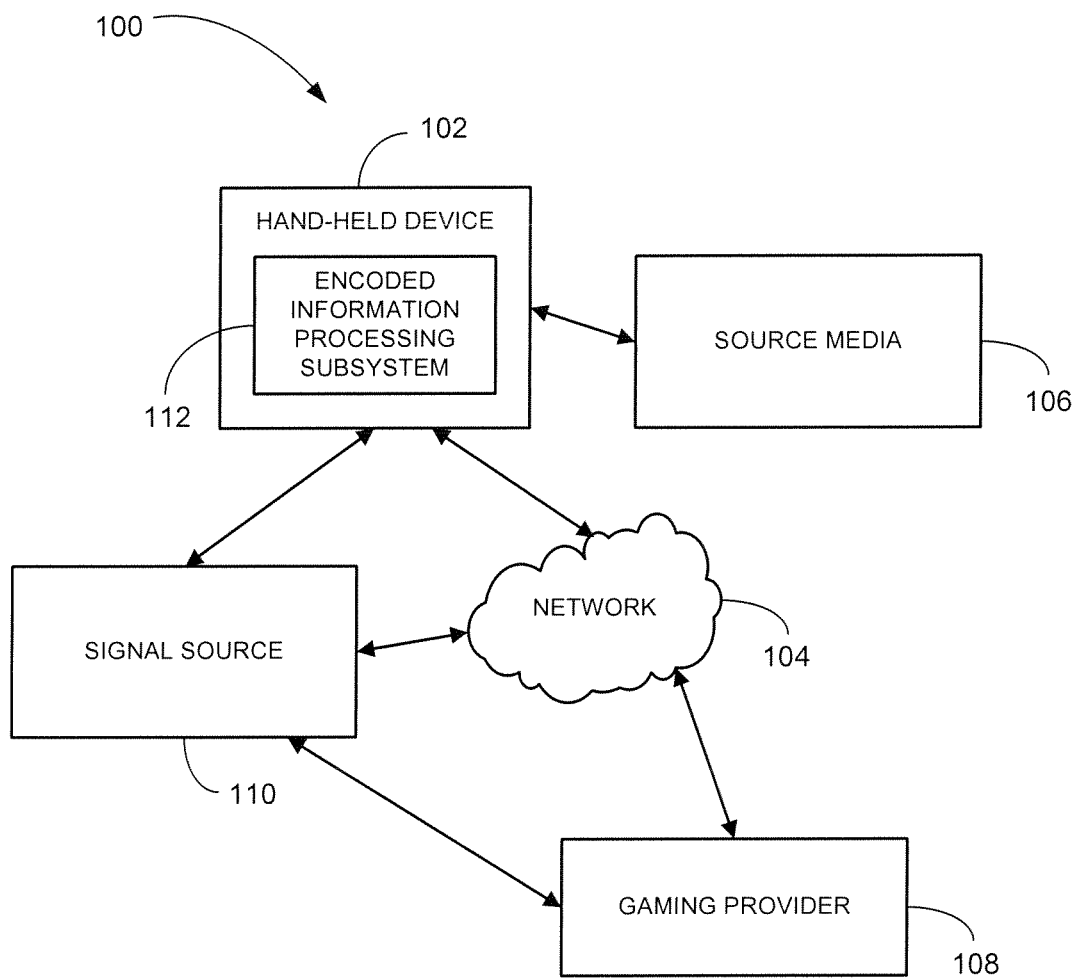
FIG. 1 is a block diagram illustrating a system, according to an example embodiment.

FIG. 1 illustrates an example gaming system 100 in which a hand-held device 102 may detect an encoded pattern from source media 106 and/or receive an encoded audio signal from a signal source 110. The encoded pattern and/or the encoded audio signal may be decoded to obtain gaming data and/or synchronization data. The gaming data and synchronization data may be used to enable a user with the hand-held device 102 to play along with a game being presented on a display device. For example, the gaming data may be puzzle data and the synchronization data may be puzzle timing data to indicate which puzzle should be presented on the hand-held device 102.

The hand-held device 102 may be a portable gaming device, a mobile telephone, a smart card, a portable computer, or the like. Other types of hand-held devices may also be used. The source media 106 may include, by way of example, printed matter, a display device, or the like. The source media 106 may be capable of presenting an encoded pattern (e.g., a bar code) that is detectable by the hand-held device 102. For example, the source media 106 may include printed media (e.g., a newspaper article), electronic media (e.g., a web page), and other types of visual media that are capable of visually presenting an encoded pattern. The source media 106 may, in an example embodiment, be provided by the signal source 110.

The hand-held device 102 may include an encoded information processing subsystem 112 to obtain and use gaming data, promotional data, and/or synchronization data.

In an example embodiment, the hand-held device 102 may include a CMOS imaging sensor, a 32-bit microprocessor and external memory. For example, the hardware of the hand-held device 102 may include OEM part number: 5080SR-1212A0R by Honeywell Imaging and Mobility, a color CMOS imaging device (e.g., the Omni Vision OV7670) and a 32-bit microcontroller (e.g., the Sunplus SPG293A). The encoded pattern decoding software may be ADAPTEC from Honeywell Imaging and Mobility. However, other configurations of hardware and software may also be used.

The gaming provider 108 may interact with the hand-held device 102 over a network 104 to track scores of various users, provide electronic coupons, and the like. For example, a score or other performance indicator may be sent over the network 104 from the hand-held device 102 to the gaming provider 108. The gaming provider 108 may be associated with the game being presented on the display device. The hand-held device 102 may redeem promotional opportunities over the network 104, or may be physically taken into a store for redemption.

The network 104 may be a television distribution network, Global System for Mobile Communications (GSM) network, an Internet Protocol (IP) network, a Wireless Application Protocol (WAP) network, and/or a WiFi network. Other networks may also be used.

The signal source 110 may include a display device, an audio reproduction device, or the like. The signal source 110 may receive the content from a television broadcast station, over the network 104, from a DVD, from local storage, or may otherwise be received. The content may include an encoded audio signal, an encoded video signal, or a different type of content signal. The audio signal may be encoded with RDS or otherwise encoded. The gaming provider 108 may be affiliated with the provider of content of the signal source 110. Promotional data may be presented on the hand-held device 102 based on a presentation being made on the signal source 110.

One or more signal sources 110 may be used. For example, the source media 106 may be read from a first signal source 110, and the synchronization data may received from a second signal source 110.

Figure 2:
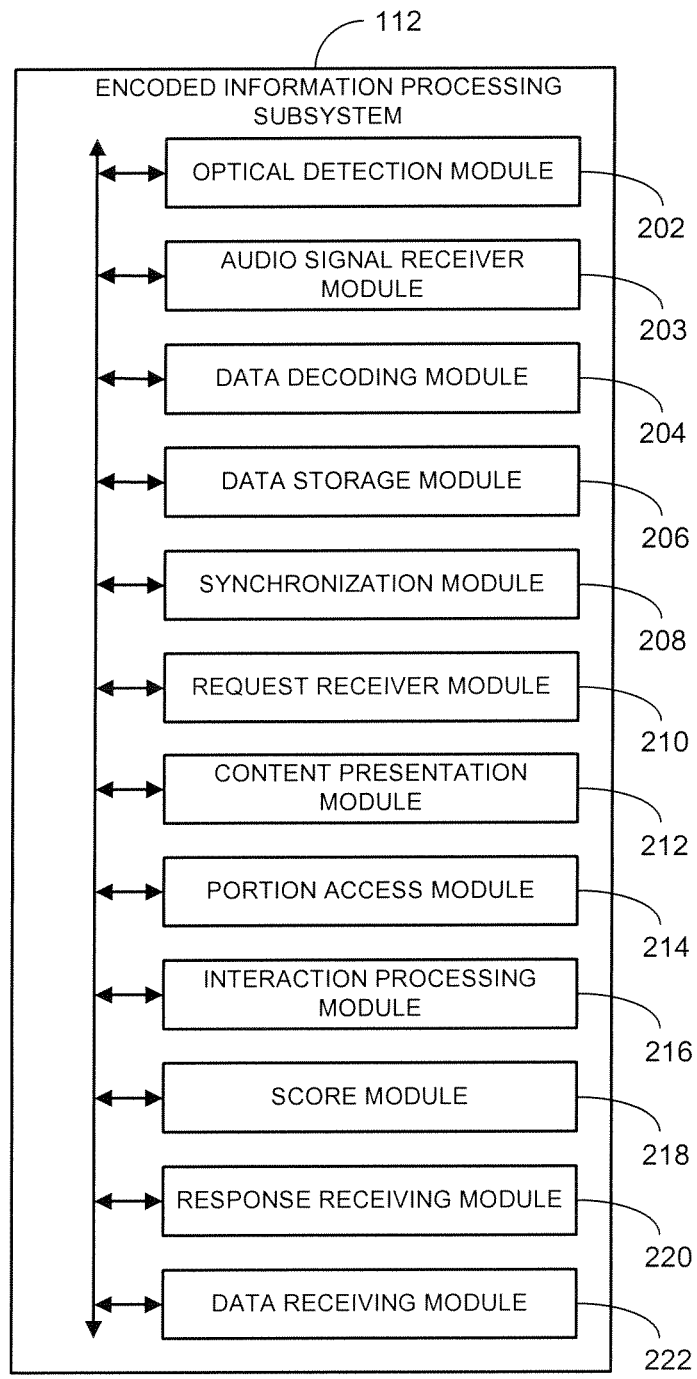
FIG. 2 is a block diagram illustrating an example encoded information processing subsystem that may be deployed in the hand-held device of the FIG. 1, according to an example embodiment.

FIG. 2 illustrates an example encoded information processing subsystem 112 that may be deployed in the hand-held device 102 of the system 100 (see FIG. 1), or may be otherwise deployed. The inclusion of the subsystem 112 on the hand-held device 102 may, in an example embodiment, enable real-time play with the signal source 110.

The encoded information processing subsystem 112 may include an optical detection module 202, an audio signal receiver module 203, a data decoding module 204, a data storage module 206, a synchronization module 208, a request receiver module 210, a content provider module 212, a portion access module 214, an interaction processing module 216, a score module 218, a response receiving module 220, and/or a data receiving module 222. Other modules may also be included. In various embodiments, the modules may be distributed so that some of the modules may be deployed in the hand-held device 102 and some of the modules may be deployed in an additional device.

The optical detection module 202 optically detects an encoded pattern from the source media 106. The audio signal receiver module 203 receives an encoded audio signal from the signal source 110. The data decoding module 204 decodes gaming data, synchronization data and/or promotional data from the encoded pattern and/or the encoded audio signals. The modules 202-204 may be used to preload the hand-held device 102 with data that may be used based on receipt of synchronization data.

The data storage module 206 stores the gaming data and/or the synchronization data. The synchronization module 208 synchronizes the stored gaming data for use during gaming and/or the promotional data for use during operation of the hand-held device 102 based on the synchronization data. The synchronization may include scheduling the gaming data for use during gaming and/or the promotional data for use during operation of the hand-held device 102 based on the synchronization data. For example, the synchronization data may include a single synchronization (e.g., to act as a trigger) or multiple synchronizations (e.g., based on time codes of the content signal provided by the signal source 110).

The request receiver module 210 receives a request for gaming execution. The content provider module 212 provides gaming content during the gaming. The gaming content may be provided by audibly presenting the gaming content through a speaker on the hand-held device 102 or an audio output of the hand-held device 102, visibly presenting the gaming content through a display on the hand-held device 102 or a video output of the hand-held device 102, and/or may be otherwise presented. The gaming content may be provided based on receipt of the request.

The portion access module 214 accesses a portion of the stored gaming data during the gaming in accordance with the synchronization data. The portion of the gaming data may be used during the providing of the gaming content. The interaction processing module 216 processes gaming interactions from a user during the gaming.

The score module 218 calculates and/or stores a score based on the performance of a user during the gaming. The response receiving module 220 receives an electronic coupon and/or a player ranking from the gaming provider 108. The data receiving module 222 receives synchronization data from the presentation device 202 (see FIG. 2).

Figure 3:
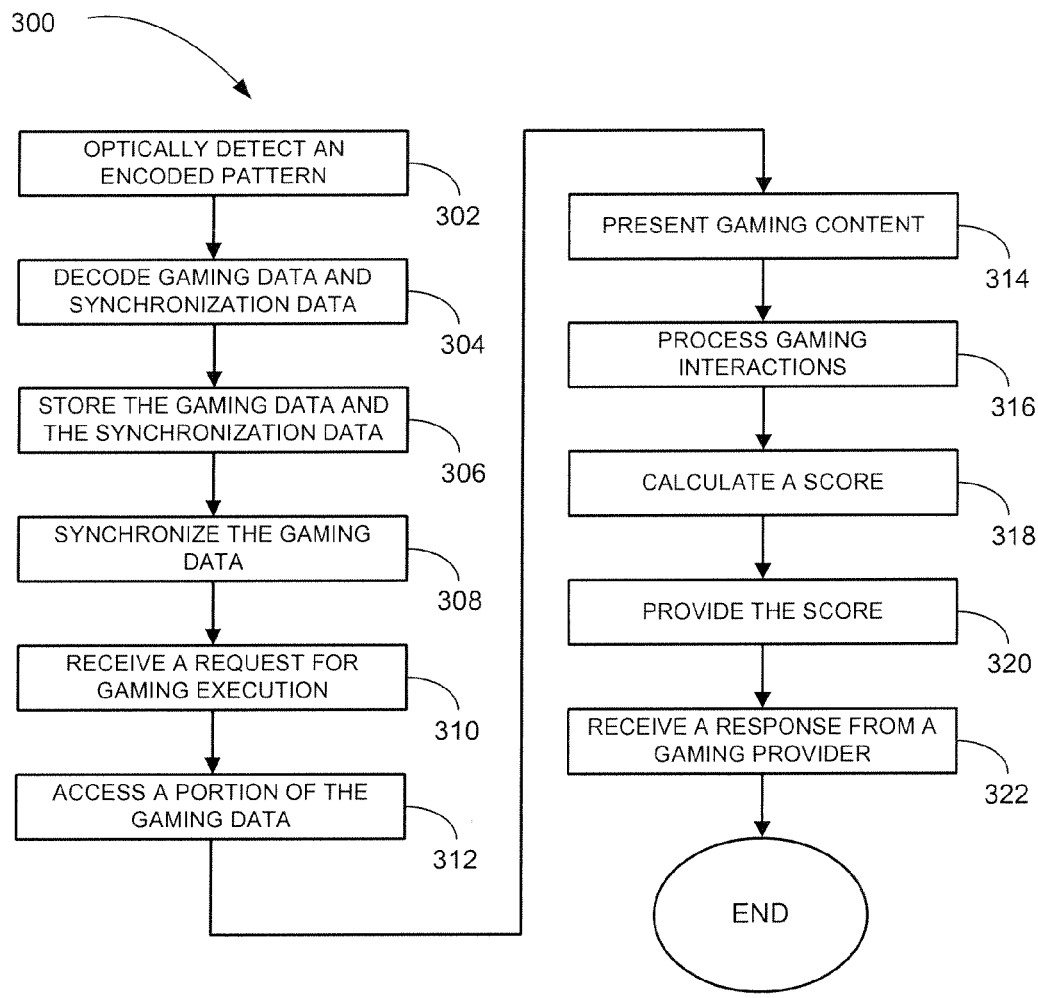
FIGS. 3-8 are flowcharts illustrating methods for encoded information processing, processing according to example embodiments.

FIG. 3 illustrates a method 300 for encoded information processing according to an example embodiment. The method 300 may be performed by the hand-held device 102 (see FIG. 1) of the system 100, or it may be otherwise performed. In an example embodiment, the method 300 may obtain gaming data and synchronization data from an encoded pattern.

An encoded pattern is optically detected from the source media 106 at block 302. The encoded pattern may be a bar code or other machine readable representations of data in a visual form. The bar code may be one-dimensional such as a UPC bar code. The bar code may be multi-dimensional (e.g., two-dimensional bar codes such as an Aztec code, Data Matrix, Dataglyph, MaxiCode, PDF317, QR Code, Ultra Code or UCC RSS-2D bar code). Other types of bar codes may also be used.

Gaming data and associated synchronization data are decoded from the encoded pattern at block 304. The gaming data may include puzzle data, map data, character data, weapon data, or any other data that may contribute or enhance game play. For example, the gaming data may be puzzles for the WHEEL OF FORTUNE game show, answers and/or questions for the JEOPARDY game show, questions from the WHO WANTS TO BE A MILLIONAIRE game show, or the like. The gaming data may provide a patch or other type of update for a video gaming operating on the hand-held device 102.

The synchronization data may indicate when portions or the gaming data may be used by the video game. For example, puzzle start times may indicate when puzzle data will be made available for use by the video game. Adventure usage may indicate when additional levels, characters, or weapons are available to a player of the video game.

The synchronization data may enable game play along with the content (e.g., coordinated game play) being presented by the signal source 110.

The gaming data and/or the synchronization data may be stored at block 306. The gaming data and/or the synchronization data may be stored on the hand-held device 102, or otherwise stored. For example, the gaming data and/or the synchronization data may be stored on a remote server available over the network 104 or a data storage device connected to the hand-held device 102.

The gaming data may be synchronized for use during gaming based on the synchronization data at block 308. The synchronization of the gaming data may enable the gaming to be synchronized to content provided by the signal source 110. In an example embodiment, the synchronization of gaming data may enable enhanced video game play by allowing a user of the video game to experience additional game functionality at specified times during game play.

A request for gaming execution may be received at block 310. The request for gaming execution may be for the video game to start or to continue play in an ongoing game. The operations performed at blocks 302-308 may occur while the video game is being played, during a stop in play, or when the hand-held device 102 is not being used for game play.

At block 312, a portion of the gaming data may be accessed during the gaming based on the synchronization data. The portion of the gaming data may be used during the providing of the gaming content.

Gaming content may be presented during the gaming at block 314. The gaming content may be presented based on the receipt of the request. The presentation of the gaming content may include an audio/video presentation to which the user can interact or control based on usage of the hand-held device 102.

Gaming interactions may be processed from a user during the gaming at block 316. The gaming interactions may include guessing letters or the solution to a puzzle, moving a character through a maze, or the like.

A score may be calculated based on the performance of the user during the gaming at block 318. The score may reflect a number of puzzles correctly solved, a number of monsters defeated, or the like.

The score may be provided based on the performance of the user during the gaming at block 320. The score may be presented to the user through display on the hand-held device 102, may be provided to the user through electronic mail, or may otherwise be made available to the user. The score may be provided to the gaming provider 108.

A response may be received from the gaming provider 108 at block 322. The response may include an electronic coupon, a player ranking, or the like. The electronic coupon may reward the user for participation in the video game. The player ranking may rank the user's performance in the video game relative to other users.

Figure 4:
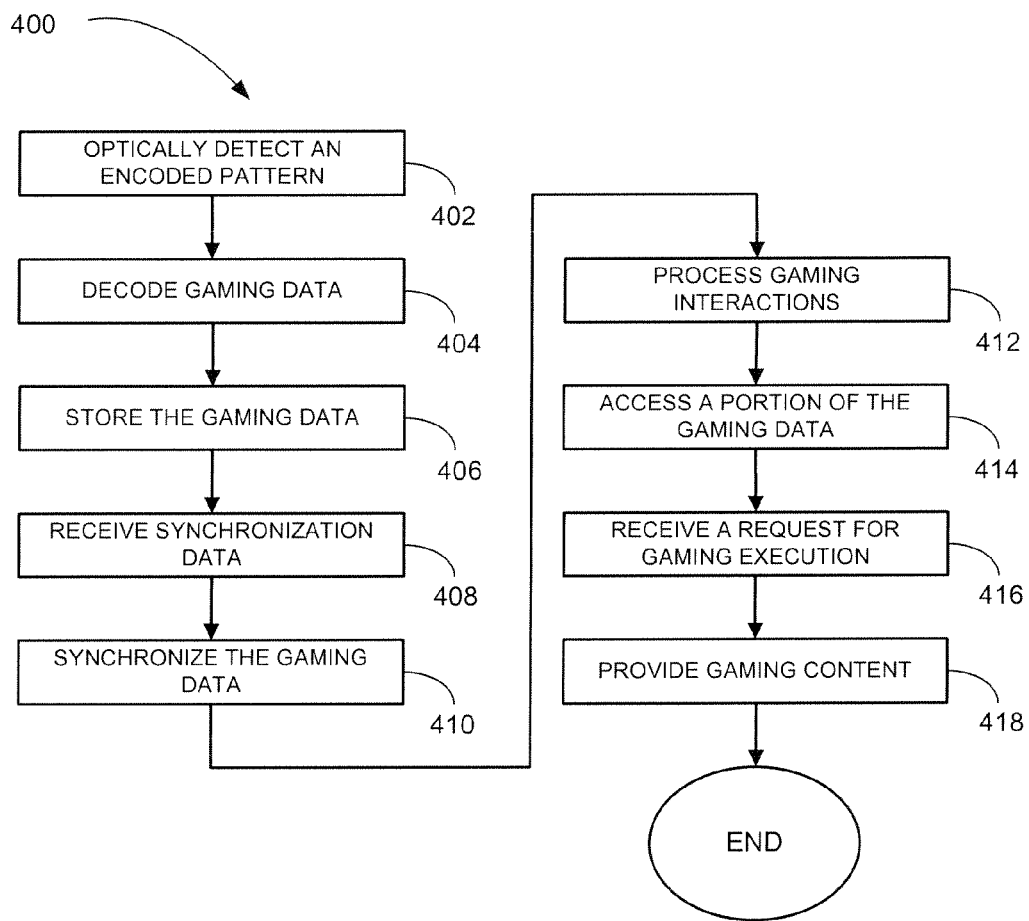

FIG. 4 illustrates a method 400 for encoded information processing according to an example embodiment. The method 400 may be performed by the hand-held device 102 (see FIG. 1) of the system 100, or it may be otherwise performed. In an example embodiment, the method 400 may obtain gaming data from an encoded pattern and synchronization data from the signal source 110.

An encoded pattern is optically detected from the source media 106 at block 402. Gaming data is decoded from the encoded pattern at block 404. The gaming data may be stored at block 406.

Synchronization data is received from the signal source 110 at block 408. The synchronization data may be encoded in an audio portion and/or a video portion of a content signal (e.g., a video signal) associated with the game. For example, a television show presented on the signal source 110 in the form of a display device may present an encoded content signal having the synchronization data encoded through use of dual tone multiple frequency (DTMF), luminance modulation, chrominance modulation, or the like.

The gaming data may be synchronized for use during the gaming based on the synchronization data at block 410. Gaming interactions received from a user during the gaming may be processed at block 412.

A portion of the gaming data is accessed based on the synchronization data at block 414. The gaming data may be accessed based receipt of the synchronization signal, the scheduling of the gaming data, receiving of the gaming interactions, or may be otherwise accessed.

A request may be received for gaming execution at block 416. Gaming content including the portion of the gaming data is provided during the gaming at block 418. The gaming content may be provided in response to the receipt of the request.

In an example embodiment, the operations performed at blocks 318-322 may be performed with the method 400.

Figure 5:
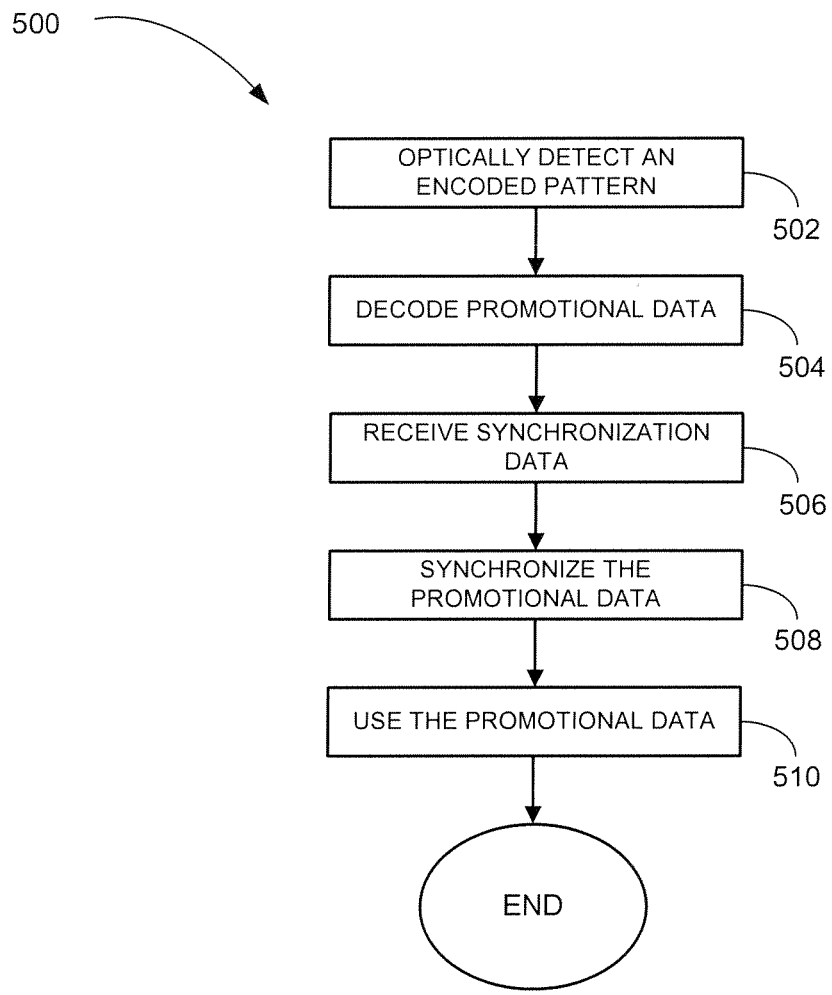

FIG. 5 illustrates a method 500 for pattern processing according to an example embodiment. The method 500 may be performed by the hand-held device 102 of the system 100, or it may be otherwise performed.

At block 502, an encoded pattern is optically detected from the source media 106. Promotional data is decoded from the encoded pattern at block 504.

Synchronization data is received from the presentation device 202 at block 506. In an example embodiment, the synchronization data may be received from a video signal presented on the presentation device 202 in the form of a display device. The synchronization data may be encoded within the video signal in a substantially invisible way.

At block 508, the promotional data is synchronized for use during operation of the hand-held device 102 based on the synchronization data. The promotional data may be used based on the synchronization at block 510. For example, the promotional data may be presented (e.g., as an advertisement or a promotion) on a display of the hand-held device 102 based on the synchronization data. The promotional data may be otherwise used.

Figure 6:
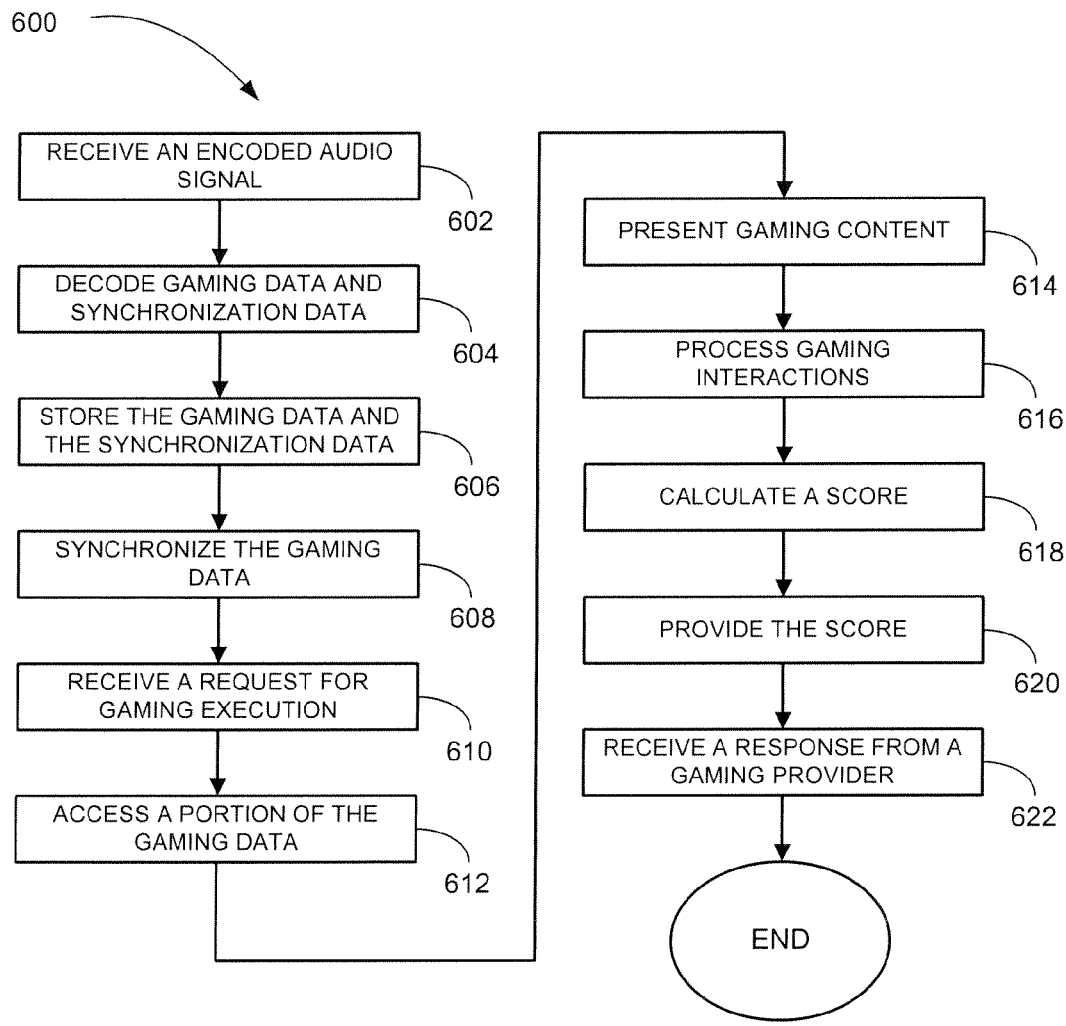

FIG. 6 illustrates a method 600 for encoded information processing according to an example embodiment. The method 600 may be performed by the hand-held device 102 (see FIG. 1) of the system 100, or it may be otherwise performed. In an example embodiment, the method 600 may obtain gaming data and synchronization data from an encoded audio signal.

An encoded audio signal is audibly received from the signal source 110 at block 602. The audio signal may be encoded through DTMF, or other methods of encoding data along with an audio signal. Gaming data and associated synchronization data are decoded from the encoded audio signal at block 604. The gaming data and/or the synchronization data may be stored at block 606.

The gaming data may be synchronized for use during gaming based on the synchronization data at block 608. In an example embodiment, the synchronization of gaming data may enable enhanced video game play by allowing a user of the video game to experience additional game functionality at specified times during game play.

A request for gaming execution may be received at block 610. The request for gaming execution may be for the video game to start or to continue play in an ongoing game. The operations performed at blocks 602-608 may occur while the video game is being played, during a stop in play, or when the hand-held device 102 is not being used for game play.

At block 612, a portion of the gaming data may be accessed during the gaming based on the synchronization data. The portion of the gaming data may be used during the providing of the gaming content.

Gaming content may be presented during the gaming at block 614. The gaming content may be presented based on the receipt of the request. The presentation of the gaming content may include an audio/video presentation to which the user can interact or control based on usage of the hand-held device 102.

Gaming interactions may be processed from a user during the gaming at block 616. The gaming interactions may include guessing letters or the solution to a puzzle, moving a character through a maze, or the like.

A score may be calculated based on the performance of the user during the gaming at block 618. The score may reflect a number of puzzles correctly solved, a number of monsters defeated, or the like.

The score may be provided based on the performance of the user during the gaming at block 620. The score may be presented to the user through display on the hand-held device 102, may be provided to the user through electronic mail, or may otherwise be made available to the user. The score may be provided to the gaming provider 108.

A response may be received from the gaming provider 108 at block 622. The response may include an electronic coupon, a player ranking, or the like. The electronic coupon may reward the user for participation in the video game. The player ranking may rank the user's performance in the video game relative to other users.

Figure 7:
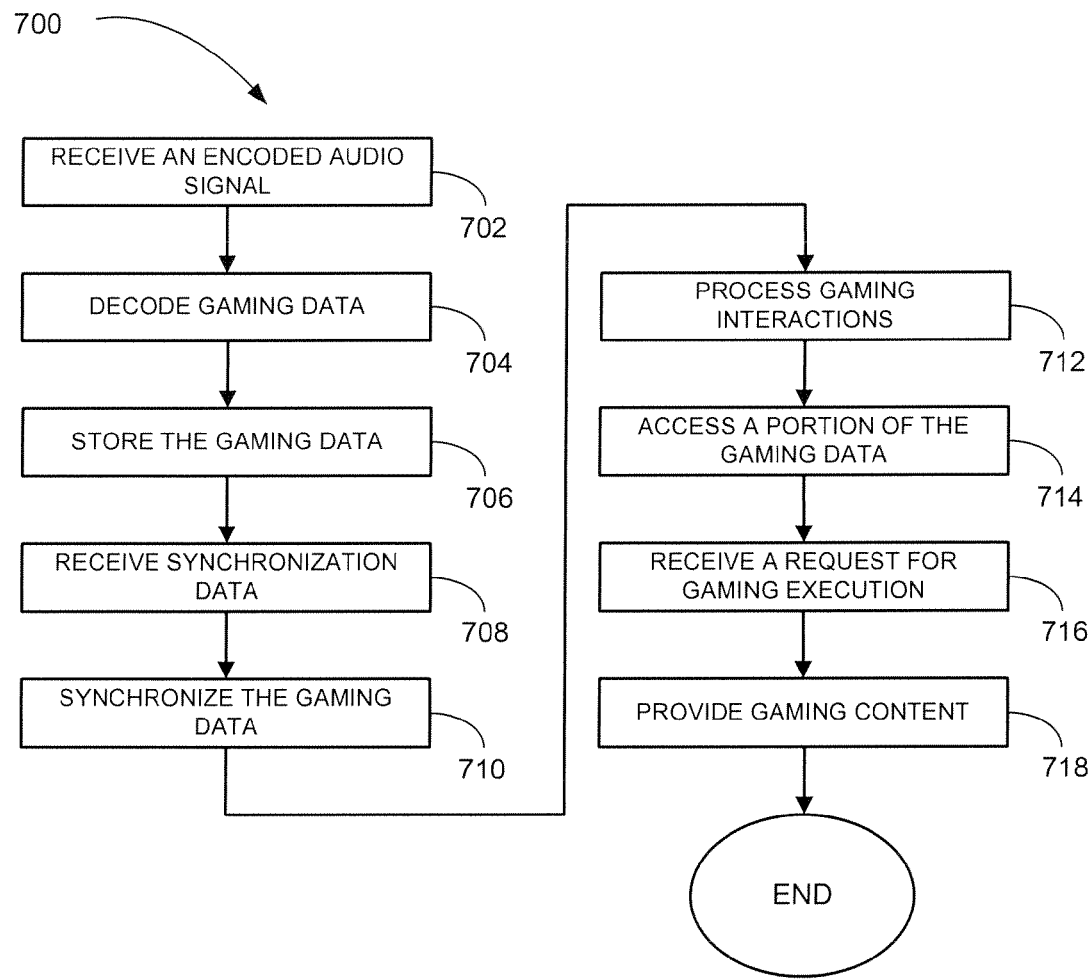

FIG. 7 illustrates a method 700 for encoded information processing according to an example embodiment. The method 700 may be performed by the hand-held device 102 (see FIG. 1) of the system 100, or it may be otherwise performed. In an example embodiment, the method 700 may obtain gaming data and synchronization data from the signal source 110.

An encoded audio signal is received from the signal source at block 702. Gaming data is decoded from the encoded audio signal at block 704. The gaming data may be stored at block 706. The gaming data may be encoded in an audio portion and/or a video portion of a content signal (e.g., a video signal) associated with the game. For example, a television show presented on the signal source 110 in the form of a display device may present an encoded content signal having the gaming data encoded through use of dual tone multiple frequency (DTMF), luminance modulation, chrominance modulation, or the like.

Synchronization data is received from the signal source 110 at block 708. The gaming data may be synchronized for use during the gaming based on the synchronization data at block 710. Gaming interactions received from a user during the gaming may be processed at block 712.

A portion of the gaming data is accessed based on the synchronization data at block 714. The gaming data may be accessed based receipt of the synchronization signal, the scheduling of the gaming data, receiving of the gaming interactions, or may be otherwise accessed.

A request may be received for gaming execution at block 716. Gaming content including the portion of the gaming data is provided during the gaming at block 718. The gaming content may be provided in response to the receipt of the request.

In an example embodiment, the operations performed at blocks 618-622 may be performed with the method 700.

Figure 8:
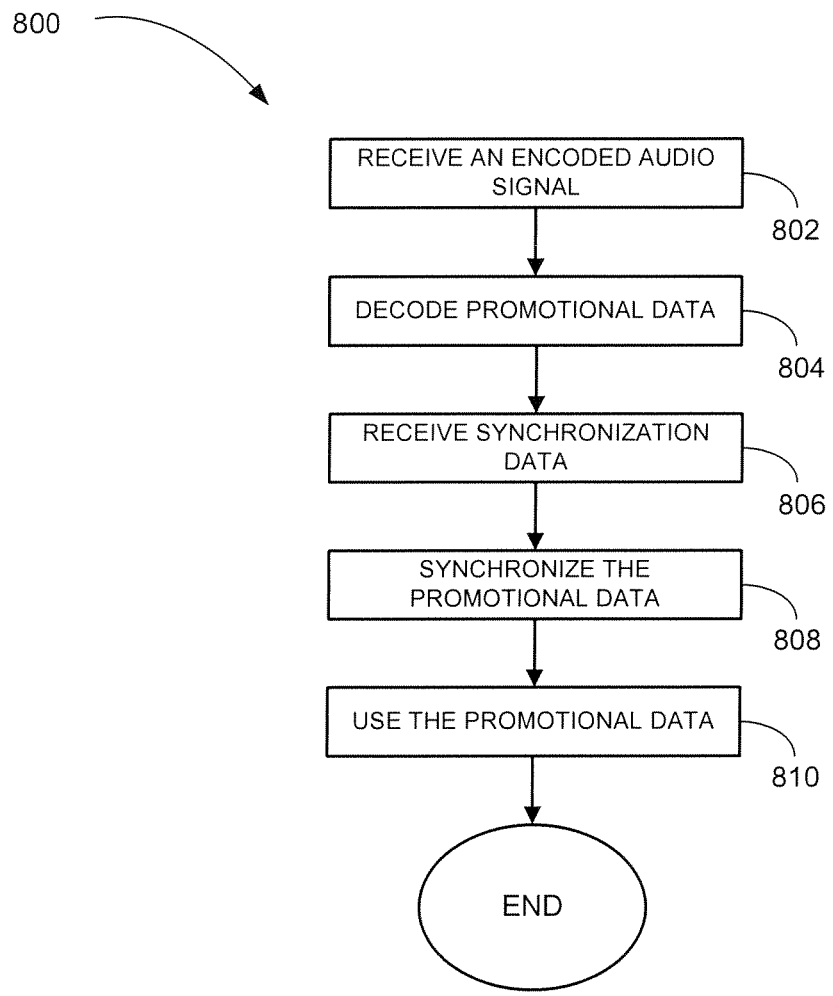

FIG. 8 illustrates a method 800 for audio signal processing according to an example embodiment. The method 800 may be performed by the hand-held device 102 (see FIG. 2) of the system 100, or it may be otherwise performed.

At block 802, an encoded audio signal is received from the signal source 110. Promotional data is decoded from the encoded audio signal at block 804.

Synchronization data is received from the presentation device 202 at block 806. In an example embodiment, the synchronization data may be received from a video signal presented on the display device. The synchronization data may be encoded within the video signal in a substantially invisible way.

At block 808, the promotional data is synchronized for use during operation of the hand-held device in accordance with the synchronization data The promotional data may be used based on the synchronized at block 810. For example, the promotional data may be presented (e.g., as an advertisement or a promotion) on a display of the hand-held device based on a schedule. The promotional data may be otherwise used.

Figure 9:
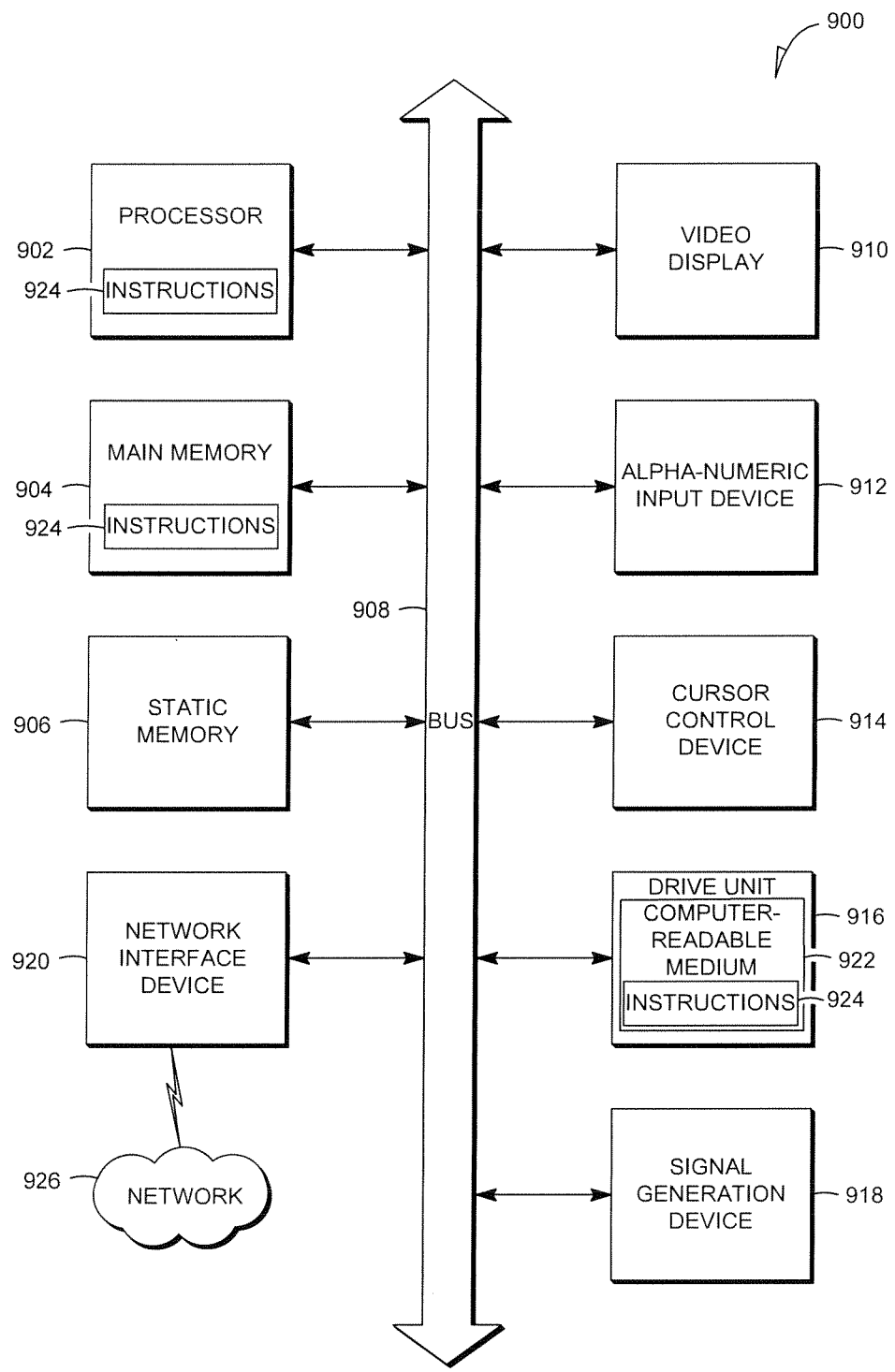
FIG. 9 is a block diagram of a machine in the example form of a computer system within which a set of instructions for causing the machine to perform one or more of the methodologies discussed herein.

FIG. 9 shows a block diagram of a machine in the example form of a computer system 900 within which a set of instructions may be executed causing the machine to perform any one or more of the methods, processes, operations, or methodologies discussed herein. The source media 106, the gaming provider 108, and/or the signal source 110 may operate on one or more computer systems 900. The hand-held device 92 may include the functionality of the one or more computer systems 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may be implemented as hardware circuitry, optical components, single or multi-processor circuits, memory circuits, software program modules and objects, firmware, and combinations thereof, as appropriate for particular implementations of various embodiments.

In an example embodiment, an encoded pattern may be optically detected from source media. Gaming data and associated synchronization data may be decoded from the encoded pattern. The gaming data may be synchronized for use during gaming based on the synchronization data. The synchronization of the gaming data may enable the gaming to be synchronized to content provided by a signal source.

In an example embodiment, an encoded pattern may be optically detected from source media. Gaming data may be decoded from the encoded pattern. Synchronization data may be received from a signal source. A portion of the gaming data may be accessed based on the synchronization data. Gaming content including the portion of the gaming data may be provided during the gaming.

In an example embodiment, an encoded pattern may be optically detected from source media on a held-held device. Promotional data may be decoded from the encoded pattern. Synchronization data may be received on the held-held device from a presentation device. The promotional data may be schedule for use during operation of the hand-held device based on the synchronization data.

In an example embodiment, an encoded audio signal may be received from a signal source. Gaming data and associated synchronization data may be decoded from the encoded audio signal. The gaming data may be scheduled for use during gaming based on the synchronization data. The synchronization of the gaming data may enable the gaming to be synchronized to content provided by a signal source.

Thus, methods and systems for encoded information processing have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    optically detecting, using an optical sensor, an encoded pattern from source media, the encoded pattern associated with a gaming application;
    decoding, using one or more processors, gaming data from the encoded pattern, the gaming data used to participate in the gaming application;
    synchronizing the gaming data played with the gaming application being played by a user with broadcast programming content, wherein the gaming data is decoded from the encoded pattern prior to presentation of the broadcast programming content but is only available when the broadcast programming content is presented;
    presenting device content based on the synchronizing of the gaming data with the broadcast programming content;
    processing, using the one or more processors, a plurality of gaming interactions from the user during presentation of the broadcast programming content and the presenting of the device content;
    tracking performance of the user in the plurality of gaming interactions during the presentation of the broadcast programming content and the presenting of the device content; and
    enabling a promotional opportunity based on the processing of at least some of the plurality of gaming interactions.

2. The method of claim 1, further comprising:
    receiving a content signal from a signal source during presentation of the broadcast programming content; and
    determining whether the content signal includes a trigger, wherein the synchronizing of the gaming data with the gaming application occurs responsive to receiving the trigger.

3. The method of claim 1, wherein synchronizing the gaming data with the gaming application enables real-time play of the gaming application by the user with the presentation of the broadcast programming content.

4. The method of claim 1, wherein the gaming application is a home-play version of a game presented by the broadcast programming content.

5. The method of claim 2, wherein the content signal is a video signal.

6. The method of claim 1, further comprising:
    receiving the gaming application from the gaming provider.

7. The method of claim 1, wherein enabling the promotional opportunity comprises:
    providing a result of the processing of the plurality of gaming interactions to the gaming provider; and
    receiving the promotional opportunity from the gaming provider.

8. The method of claim 1, wherein the promotional opportunity includes continued play of the gaming application, redeemable points, or one or more combinations thereof.

9. The method of claim 1, wherein the encoded pattern is a bar code.

10. The method of claim 1, wherein the gaming data is puzzle data, map data character data, weapon data, or one or more combinations thereof.

11. The method of claim 1, wherein synchronizing the gaming data with the gaming application includes altering game play of the gaming application responsive to information presented in the broadcast programming content.

12. A method comprising:
    optically detecting, using a sensor, an encoded pattern from source media that is available to a user, the encoded pattern associated with a gaming application being played by the user;
    decoding, using one or more processing devices, gaming data from the encoded pattern;
    obtaining synchronization data that identifies at least first and second portions of the gaming data and when each of the first and second portions of the gaming data is to be used in the gaming application being played by the user;
    synchronizing, using the one or more processing devices, the first and second portions of the gaming data with the gaming application and broadcast content at different respective times that are identified by the synchronization data, wherein the gaming data is decoded from the encoded pattern prior to presentation of the broadcast content but is only available when the broadcast content is presented;

presenting device content, using a display, based on the synchronizing of the first and second portions of the gaming data with the gaming application and the broadcast content;

processing, using the one or more processing devices, gaming interactions from the user during presentation of the broadcast content and the presenting of the device content; and enabling a promotional opportunity based on the processing of the one or more of the gaming interactions.

13. The method of claim 12, wherein the source media includes electronic media.

14. The method of claim 12, wherein the encoded pattern is visible to an ordinary viewer of the source media.

15. The method of claim 12, wherein the promotional opportunity includes an electronic coupon.

16. A non-transitory machine-readable medium comprising instructions, which when executed by one or more processors, cause the one or more processors to perform the following operations:

optically detect an encoded pattern from source media, the encoded pattern associated with a gaming application;

decode gaming data from the encoded pattern, the gaming data used to participate in the gaming application;

synchronize the gaming data played with the gaming application during play of the gaming application by a user with broadcast programming content, wherein the gaming data is decoded from the encoded pattern prior to presentation of the broadcast programming content but is only available when the broadcast programming content is presented;

present device content based on the synchronizing of the gaming data with the broadcast programming content;

process one or more gaming interactions from the user during presentation of the broadcast programming content and the device content;

track performance of the user in the one or more gaming interactions during the presentation of the broadcast programming content and the presenting of the device content; and enable a promotional opportunity based on processing of one or more of the gaming interactions.

17. The non-transitory machine-readable medium of claim 16, wherein the instructions, when implemented by the one or more processors, cause the one or more processors to perform the following operations:

receive a content signal from a signal source during the presentation of the broadcast programming content; and determine whether the content signal includes a trigger, wherein the synchronizing of the gaming data with the gaming application occurs responsive to receiving the trigger.

18. The non-transitory machine-readable medium of claim 16, wherein the instructions, when implemented by the one or more processors, cause the one or more processors to enable real-time play of the gaming application with the presentation of the broadcast programming content by synchronizing the gaming data with the gaming application.

19. The non-transitory machine-readable medium of claim 16, wherein the gaming application is a home-play version of a game presented by the broadcast programming content.

20. The non-transitory machine-readable medium of claim 17, wherein the trigger is an audio signal in the broadcast programming content.

21. The method of claim 1, further comprising:
obtaining an encoded audio signal; and
decoding additional gaming data from the encoded audio signal using the one or more processors, wherein synchronizing the gaming data with the gaming application includes synchronizing both the gaming data that is decoded from the encoded pattern and the additional gaming data that is decoded from the encoded audio signal with the gaming application being played by the user.

22. The method of claim 1, further comprising:
receiving an encoded audio signal from a signal source; and
decoding synchronization data from the encoded audio signal, wherein the synchronization data is used to synchronize the gaming data with the gaming application.

23. The method of claim 1, further comprising obtaining synchronization data that identifies at least first and second portions of the gaming data and when each of the first and second portions of the gaming data is to be used in the gaming application being played by the user, wherein synchronizing the gaming data includes synchronizing the first and second portions of the gaming data with the gaming application and the broadcast programming content at different respective times that are identified by the synchronization data.

24. The method of claim 2, wherein the trigger in the content signal is an audio trigger.

* * * * *